United States Patent [19]

Lifshits et al.

[11] Patent Number: 5,310,337
[45] Date of Patent: May 10, 1994

[54] VIBRATION-RESISTANT LOW $NO_x$ BURNER

[75] Inventors: Vladimir Lifshits, Burlingame; Steve B. Londerville, Half Moon Bay, both of Calif.

[73] Assignee: Coen Company, Inc., Burlingame, Calif.

[21] Appl. No.: 68,372

[22] Filed: May 27, 1993

[51] Int. Cl.⁵ .............................................. F23C 5/00
[52] U.S. Cl. .................................. 431/174; 431/175; 431/177; 431/185; 431/284
[58] Field of Search ............... 431/174, 175, 177, 178, 431/284, 183, 185, 187

[56] References Cited

U.S. PATENT DOCUMENTS

| | | | |
|---|---|---|---|
| 1,960,609 | 5/1934 | Werner | 431/174 |
| 2,344,936 | 3/1944 | Zink | 431/175 |
| 2,531,316 | 11/1950 | Zink | 431/175 |
| 3,163,203 | 12/1964 | Ihlenfield | 431/284 |
| 3,164,200 | 1/1965 | Reed | 431/175 |
| 5,102,329 | 4/1992 | Lifshits | 431/178 |

Primary Examiner—Carroll B. Dority
Attorney, Agent, or Firm—Townsend and Townsend Khourie and Crew

[57] ABSTRACT

A low $NO_x$ burner includes a burner plate having a plurality of slots from which fuel gas jets and combustion air are discharged. A plurality of fuel tubes are aligned with the slots for discharging the fuel gas therethrough. The fuel tubes are spaced from the slots so that combustion air, provided by a wind box, also can flow through the slots. The fuel gas and combustion air are discharged at high velocity, thereby generating very high turbulence in the combustion chamber downstream from the burner. The slots are arranged such that the width of the recirculation zones between adjacent slots substantially varies between the central region of the burner plate and its perimeter. With this construction, the local ignition patterns vary such that local oscillations of flame front occur at different frequencies and are not synchronized so that vibrations are greatly dampened and resonance problems in the furnace minimized or eliminated. Preferably a gas nozzle is arranged at the center of the burner plate and is provided with fuel gas discharge ports to direct fuel gas in a direction tangential to the nozzle so as to induce gas exiting therefrom to swirl downstream from the burner plate. A spinner also is arranged around this central gas nozzle to cause combustion air channeled around the nozzle to swirl downstream from the nozzle. In this way, flame stability without air preheat is achieved with up to 110% excess air.

27 Claims, 3 Drawing Sheets

VIBRATION-RESISTANT LOW NO$_x$ BURNER

BACKGROUND OF THE INVENTION

The present invention relates to burners generally, and more particularly to a low NO$_x$ burner having enhanced flame stability and a construction that minimizes vibration generation and accompanying furnace rumble (low-frequency loud noise).

Generally, NO$_x$ emissions rise exponentially with combustion temperature. These emissions typically are reduced by lowering combustion temperatures. In some cases this is accomplished by combusting the fuel with an increased amount of excess air (lean mixture).

One example of a system using excess air to reduce NO$_x$ emissions is disclosed in the article "The Development of a Natural Gas-Fired Combustor for Direct-Air" from the 1992 International Gas Research Conference. In this burner system, the fuel and gas are premixed and then injected in the combustion chamber. The air-fuel mixture is adjusted to provide whatever amount of excess air is desired to lower the temperature so that NO$_x$ emissions are minimized. However, one of the drawbacks of this system is that there remains the danger of explosions upstream from the combustion chamber, for example, in the burner.

In U.S. Pat. No. 5,102,329, a low NO$_x$ burner is disclosed, in which mixing of fuel gas and combustion air to the extent necessary for combustion in the burner is precluded. In this burner, fuel tubes or spuds are arranged over slots in a burner plate to discharge fuel gas therethrough at high velocities. Combustion air also is discharged from the burner through these slots. Although some mixing of fuel gas and combustion air (controlled exclusively by fuel gas jet entrainment of the combustion air) occurs along the boundary line between each cone-shaped fuel gas jet and the air, the space volume where this mixing occurs is negligible. In addition, the flow pattern in this area has a velocity component in the downstream direction that many times exceeds the propagation velocity of the flame. Accordingly, any flame flashback from the combustion chamber is precluded.

Although the above systems advantageously reduce NO$_x$ emissions, and in the latter case, minimize the possibility of flame flashback, they are subject to combustion or air flow driven pulsation of the flame front, which causes strong vibration and rumbling in the furnace. In burners generally, the combustion amplifies pulsations which typically occur at a frequency of about 8–200 Hz due to the particular characteristics of the air supply fan or duct work, for example, or resonance modes of a furnace. It has been found that when heat of combustion is applied rapidly and uniformly to the flow of fuel and air downstream of the burner in the area of combustion, these pulsations can be amplified more easily. As a result, the flame front oscillates toward and away from the burner plate at a frequency determined by the system. This leads to vibrations, and causes resonance of the hardware of the furnace, known as rumbling. These vibrations, and resonance problems are of particular concern in large combustion devices.

Another way to reduce flame temperature, and consequently NO$_x$ emissions, is to enhance entrainment of relatively cold oxygen deficient gases from the furnace volume into the combustion space by using the kinetic energy of the air and fuel flows. One example of this is the "transjet" burner manufactured by Hague International. The drawbacks of this design are its inability to effectively control NO$_x$ emissions with an increase of excess air, large size for a given heat input, and high air pressure requirement. Expensive heat and corrosion resistant materials also are required with this system.

SUMMARY OF THE INVENTION

The present invention is directed to a burner which avoids the problems and disadvantages of the prior art. This goal is accomplished by providing a burner construction in which local oscillations of flame fronts are generated in the combustion chamber downstream from the burner at different frequencies which are not synchronized. In this way, vibrations are greatly dampened and resonance problems are minimized or eliminated. At the same time the burner construction is also advantageous for further reduction of NO$_x$ emissions by rapid entrainment of gases from the furnace volume into the combustion region.

According to the present invention, a burner is provided with a burner plate having a plurality of slots for introducing air and fuel gas into a combustion chamber. The slots are arranged such that the recirculation zone area between adjacent slots substantially varies between the burner center and perimeter. For example, the slots are arranged such that the distance between adjacent slots substantially varies between the central portion of the burner plate and the burner plate perimeter (i.e., they are nonparallel). The slots can be arranged in numerous configurations such as a triangle or in a star configuration where the slots are generally radially arranged. In the preferred embodiment the burner slots are generally radially arranged with their inner-end portions adjacent the center portion of the burner plate. A plurality of generally radially arranged burner tubes or spuds, each having an outer end portion and an inner end portion, are spaced from the slots and aligned therewith. Each burner tube includes a plurality of discharge openings aligned with one of the slots for directing fuel gas therethrough. The slots are oriented such that the distance between the outer end portions of adjacent slots is substantially greater than the distance between the inner end portions of those adjacent slots. It follows that the distance between the outer end portions of adjacent burner tubes also is substantially greater than the distance between the inner end portions of those adjacent tubes. Preferably, the ratio between the distance between the outer end portions and the distance between the inner end portions is at least about 2:1.

The combustion occurs at a point downstream from the burner plate where the fuel gas is mixed with enough excess air to prevent the combustion temperature from becoming too high, thereby limiting NO$_x$ production. This is done by a combination of steps: preventing an immediate ignition of the gas as it exits from the burner tubes by enveloping the gas with air along the distance from the spuds to the slots, and then inducing turbulence. Turbulence is created by discharging the gas and air at high speeds. As the gas and air emerge from the burner plate the discharged air and gas slow down. The resulting energy loss is converted into desirable turbulence. As the gas stream travels downstream, it expands in a cone shape and increasingly mixes with air and with recirculating hot gases. Under these conditions, ignition starts from the periphery of the cone shaped jets discharging from the burner plate slots, where fuel gas concentration is close to the lean flammability limit, and propagates by turbulent mixing of the recombustion gases to the jet centers. Thus, local fuel-air ratios during combustion do not exceed the average, based on total fuel and air input to the burner, and $NO_x$ formation is thereby diminished. As a result of the burner tube and slot arrangement, the width of the recirculating air zones between slots varies significantly in the radial direction. Thus, the recirculating areas of hot combustion products in the wake of the plates between slots varies significantly in the radial direction, so that local ignition patterns also vary. As a result, local oscillations of flame fronts tend to occur at different frequencies and are not synchronized. In this way, vibrations are greatly dampened and resonance problems are minimized or eliminated.

In a further embodiment, the slots (or burner tubes) can be arranged such that the angles formed between adjacent slots (or burner-tubes) vary significantly. This arrangement varies the flame front pattern generated by each slot, with the purpose of further reducing vibration. For example, the burner tubes and slots can be asymmetrically positioned around the center axis of the burner plate to achieve this result.

Preferably, a central gas nozzle is provided so that a more complex flame front shape is generated, which further reduces the possibility of undesirable vibration and provides enhanced flame stability. In one example, which has provided the desired results, the gas nozzle is arranged at the center of the burner plate and is provided with fuel gas discharge ports oriented to direct fuel gas in a direction tangential to the nozzle so as to induce gas exiting therefrom to swirl downstream from the burner plate. A spinner also can be arranged around the central gas nozzle to cause combustion air channeled around the central gas nozzle to swirl downstream from the nozzle. With this arrangement, flame stability without air preheat is achieved with up to 110% excess air for natural gas firing.

With the above design, the burner is more stable even when equipped with a very short throat. A typical throat length might be 30% of the burner diameter. As the flow of partially burned fuel and air is exiting the throat it has a spoky or star shaped pattern of flat jets. This flow entrains gases from the furnace volume more rapidly than the flow exiting a conventional burner. Thus, the flow of fresh hot combustion products becomes rapidly quenched, and $NO_x$ formation minimized.

The above is a brief description of some deficiencies in the prior art and advantages of the present invention. Other features, advantages and embodiments of the invention will be apparent to those skilled in the art from the following description, accompanying drawings, and appended claims.

DESCRIPTION OF THE PREFERRED EMBODIMENT

Figure 1:
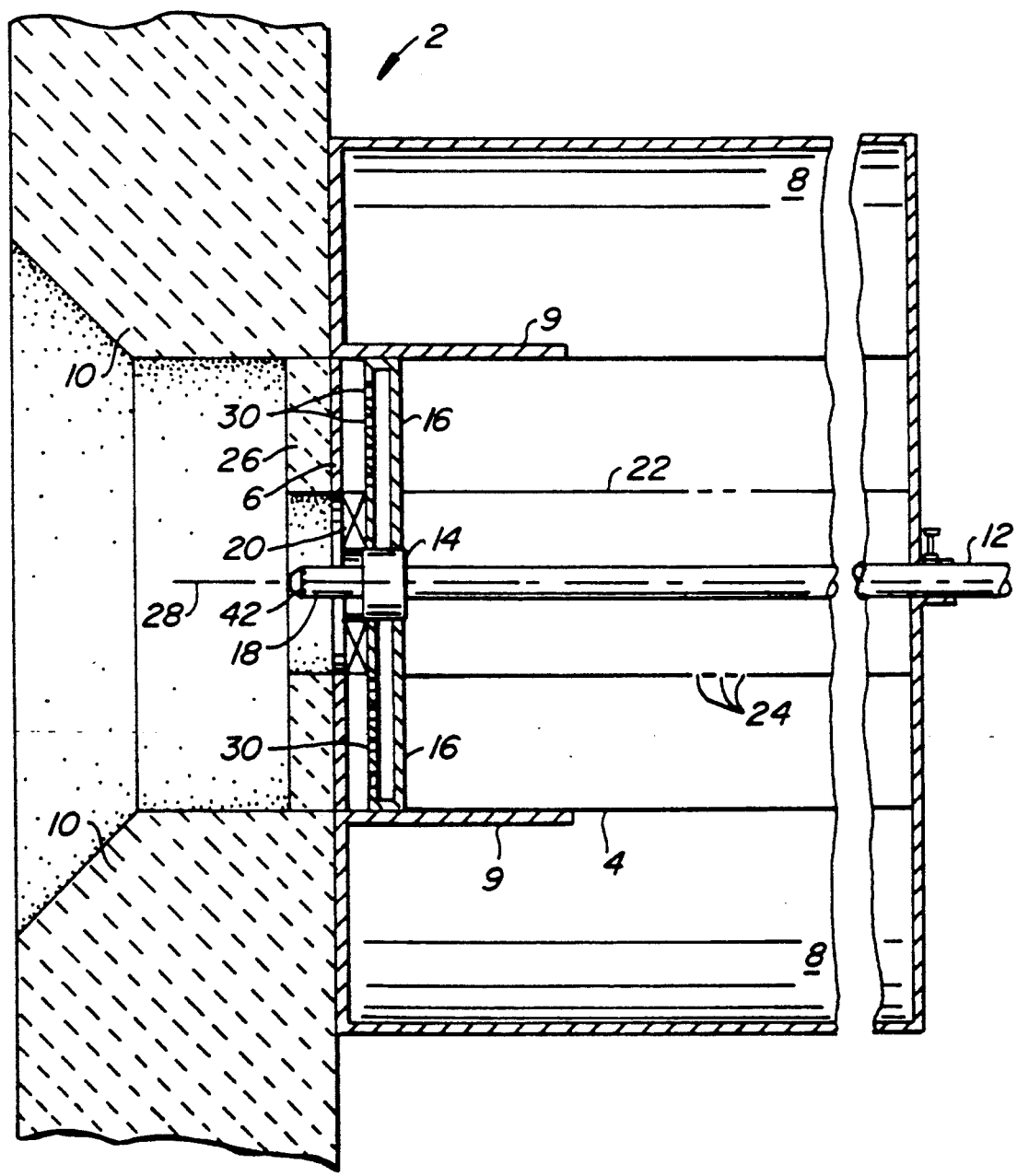
FIG. 1 is a sectional view of a burner in accordance with the principles of the present invention.

Referring to the drawings in detail, wherein like numerals indicate like elements, burner 2 is shown in accordance with the principles of the present invention. Although the burner described below includes generally radially arranged burner slots and tubes, other non-parallel slots (or burner tube) configurations can be used, such as a triangular configuration.

Referring to FIG. 1, burner 2 generally comprises housing 4 which has at one end thereof burner plate 6 through which streams of fuel gas and combustion air pass to a combustion chamber downstream therefrom. The other side of the burner housing includes a conventional door assembly (not shown) for access to the interior of the burner. Burner housing 4 is positioned within conventional wind box 8 which provides combustion air inside the burner through holes formed in the burner housing (not shown) as is conventional in the art. Wind box 8 includes mounting flanges 9 into which the burner assembly can be placed. Refractory burner throat 10 is provided around one end portion of the burner assembly to properly shape the flow of combustion products into the furnace, enhance stability, and protect the burner from the heat generated in the combustion chamber. Fuel gas supply line 12 extends through the burner and is adapted to be coupled to a fuel supply source for supplying fuel gas to manifold 14 which in turn distributes the fuel gas to burner tubes (or spuds) 16, which extend radially therefrom, and central burner 18, which is surrounded by a conventional annular air spinner 20. A conventional restrictor 22, i.e., a cylindrical wall, having through holes 24, is provided within the burner assembly to control the amount of air from the wind box that reaches the outer burner tube zone and the inner central burner zone. The restrictor forms an outer annulus and inner core of combustion air.

The front face of burner plate 6 preferably is covered by refractory material 26 having a thickness of 1½ inches, for example. Refractory material 26 can be applied directly to the burner plate by using wire anchors (if the plate is equipped with wire anchors on its outer face), or by premolding the refractory material and attaching it to the burner plate with nuts and bolts. The bolts and nuts can be embedded in the refractory material and a refractory plug used to close the resulting holes and protect the fasteners against excessive temperature.

Figure 2:
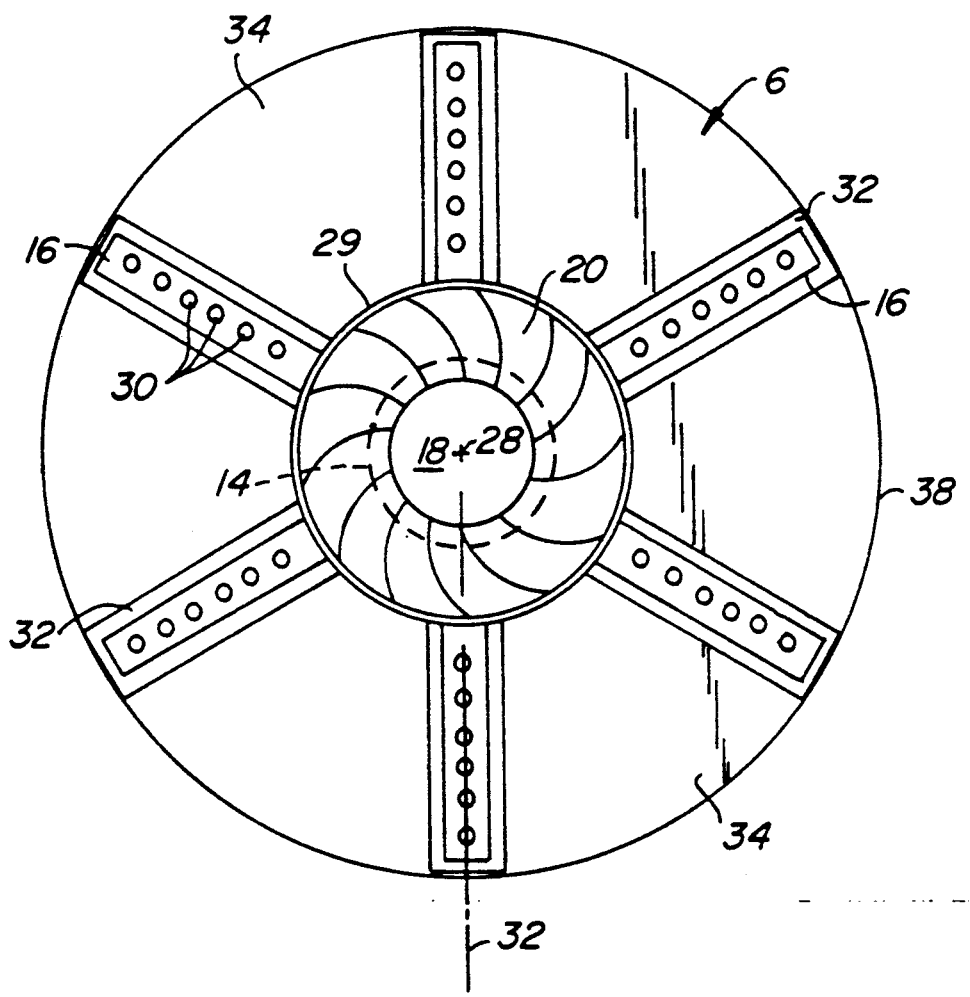
FIG. 2 is a front view of the burner of FIG. 1 in accordance with a first embodiment of the invention.

Referring to FIG. 2, the burner is shown in front view illustrating the preferred burner arrangement. Burner tubes 16 are illustrated as being symmetrically positioned around center axis 28 of annular burner plate 6 which has a center cut-out 29. Each burner tube 16 includes a plurality of discharge openings 30 of similar size and number which are aligned with one of the six illustrated slots 32 for directing fuel gas and air through the burner plate. The combustion recirculation zones formed between adjacent slots on the outer surface of the burner plate are generally designated with reference numeral 34. The burner tubes are supported by the manifold so that they are centered relative to the slots and spaced from the burner plate to provide fuel gas streams to flow through the slot with a certain partial mixing of fuel gas and air in the burner, as will be discussed in more detail below. Although burner plate 6 is illustrated as being annular, it can have other configurations without departing from the scope of the present invention.

Figure 3:
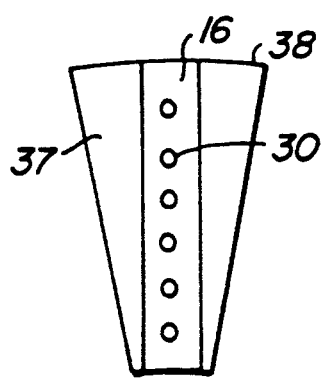
FIG. 3 illustrates a further burner slot configuration of the burner of FIG. 1.

FIG. 3 illustrates an alternative slot configuration for the burner plate, i.e., a wedge-shaped slot 37. This configuration has the advantage of having a larger cross-sectional area toward the perimeter 38 of the burner plate, allowing more air to enter into the combustion chamber, at a given air pressure at the wind box, so that the gas flow rate can be raised to increase the burner capacity. On the other hand, if it is desired to keep the burner capacity constant, this configuration reduces wind box air pressure requirements.

Figure 4:
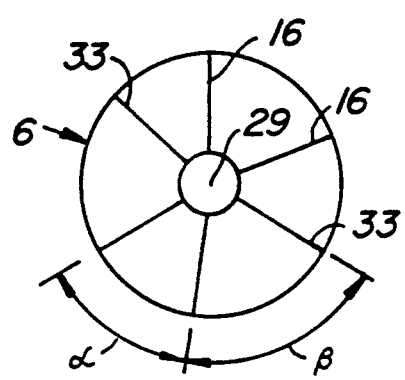
FIG. 4 schematically illustrates another arrangement of the burner tubes and burner plate slots illustrated in FIG. 2.

FIG. 4 schematically illustrates a further burner tube and slot arrangement in which the slots, as well as their corresponding burner tubes, are not equidistantly spaced about the burner plate to create a more complex flame front to reduce pulsation, as will be described in more detail below. With even slot spacing the individual flames from each slot in some instances have a tendency to "walk" from one side to the other, which might be detrimental. In the example illustrated in FIG. 4, the angle between adjacent slot centerlines 33 alternates between 50 and 70 degrees as designated with reference characters $\alpha$ and $\beta$, respectively. This uneven spacing is helpful in making the flow pattern more robust and stable.

Referring to FIGS. 1 and 2, the position of the burner tubes relative to the burner plate will be described. It is important that the fuel gas jets are aligned exactly with the burner slot centerlines (see e.g., centerline 33 in FIG. 2). Otherwise, fuel gas would be distributed unevenly across the air flow, resulting in decreased burner performance and increased $NO_x$ production. Substantial misalignment of fuel tubes or slots may cause fuel jet impingement onto the edge of burner plate 6. Such impingement can cause combustion to take place before the flow passes burner plate 6, with the result of additional flow distortion and overheating of the burner plate slot edges, which in turn could give rise to warping and flashback problems.

Although the fuel supply tubes could be placed very close to the burner plate to avoid fuel gas deflection, such an arrangement would result in the mixing of fuel gas with combustion air to occur mostly downstream of plate 6 where there is high turbulence. In that case, a portion of the fuel can burn before mixing with a sufficient amount of air, resulting in increased $NO_x$ emissions. It would also cause some delay in ignition from the moment fuel gas and combustion air exit burner plate 6. This delay would require the provision of more space between the slots to ensure the requisite recirculation of hot combustion products beneath recirculation zones 34. The increased space would significantly reduce the maximum achievable flame intensity. When the ratio between the vertical distance from the burner plate slot, at a point adjacent the outer surface of the burner plate, and its respective fuel supply tube discharge opening, and the width of the burner plate slot is about 1.5:1 to 4:1, and preferably 2–3:1, high fuel velocities can be used to provide the desired combustion characteristics.

The distance between radially oriented slots 32 also can influence flame intensity. When slots 32 are too close to one another, the size of the recirculation zones between slots and the residence time of the fuel gas-air mixtures when passing between recirculation zones are reduced to the extent that flame blowout results, while the load is below the desirable level. In other words, the period in which this fuel gas-air mixture remains exposed to the entraining of gases from the recirculation zones is insufficient to produce combustion and thus supply the recirculation zones with hot combustion products which sustain ignition. On the other hand, when adjacent slots are spaced too far apart, flame intensity significantly decreases with the decreasing amount of fuel and air per unit of burner cross-section, which generally is not desirable. As disclosed in U.S. Pat. No. 5,102,329 (which is hereby incorporated herein by reference) with the above burner construction, very high gas flow velocities and high air velocities can be used, which in turn generates high turbulence in the combustion chamber. As a result, the flame in the combustion chamber can be a high intensity short flame.

Another advantage of this construction is that with a sufficient amount of excess air, the burner generates very low $NO_x$. This results from mixing of fuel with all of the air delivered to the combustion chamber from the burner prior to ignition, thus avoiding hot spots within the flame that are associated with combustion of mixtures close to stoichiometric proportions. Specifically, the fuel gas is first ignited at a point where it is mixed with enough excess air so that the combustion temperature does not become too high, thereby limiting the $NO_x$ production. This is done by a combination of steps: preventing an immediate ignition of the gas as it exits from the spuds by enveloping the gas with air along the distance from the spuds to the slots and, then, inducing turbulence, which is accomplished by discharging the gas and air at high speeds. As the gas stream travels downstream, it expands in a cone shape and increasingly mixes with air which flows along its margin and with recirculating hot gases. Under these conditions, ignition starts from the periphery of the cone-shaped jets discharging from the slots, and propagates by turbulent mixing to the jet centers. The local concentration of fuel on the jet periphery, where the ignition starts, is close to lean flammability limit. Additional time, required for flame propagation to the jet centers, allows averaging of fuel-air ratios on the jet centers prior to the ignition. Thus, combustion occurs downstream from the burner plate only at high local excess air conditions, limiting combustion temperature and minimizing $NO_x$ production.

Low $NO_x$ burners incorporating an ignition delay as described above are known, but it has been found that the flame front generated with those systems will oscillate toward and away from the burner plate at a frequency determined by the overall construction of the burner system (for example, the frequency of the supply air flow pulsations can vary 8–200 Hz). When pulsations in the heat energy release become synchronized with the supply air frequency, amplification of the flame front pulsations results, which leads to vibrations and resonance of the hardware of the furnace, known as rumbling.

The undesirable vibration and resonance described above essentially do not take place in the burner of the present invention because of the arrangement of the burner tubes and slots which, as described in more detail below, affect the configuration of the recirculation zones so that local oscillations of flame front occur at different frequencies and are not synchronized, so that vibrations are greatly dampened and resonance problems essentially do not occur.

Returning to FIG. 2, the burner is illustrated as having six radially extending and equidistantly spaced burner tubes or spuds 16 (i.e., each burner tube pair forms an angle of about 60°). The distance between the outer end portions of adjacent burner slots is substantially greater than the distance between the inner end portions of the adjacent slots. Since the burner tubes are aligned with the slots, they are similarly arranged. This configuration results in a substantial tapering of the recirculation zone 34 in the direction of the central region of the burner plate. Preferably the ratio between the distance between the outer end portions of adjacent burner slots (or tubes) and the distance between the inner end portions is at least about 2.5:1 to provide sufficient change in the recirculation zone from the central portion of the burner plate to the perimeter of the burner plate so that ignition of adjacent flame fronts will not be synchronized.

Although the burner is illustrated with six burner tubes, other multiples of burner tubes can be used within the scope of the invention. In addition, other slot and burner tube configurations can be used in which the width or area of the recirculation zones varies significantly between the burner plate center axis 28 so that the local ignition patterns vary such that local oscillations of flame front occur at different frequencies and are not synchronized. For example, the slots can be arranged in a nonparallel configuration such as a triangle. As discussed above, the slots and burner spuds also can be asymmetrically arranged about burner center axis 28 or arranged such that the burner spuds are not equidistantly spaced about the burner plate, to form a more complex flame front and minimize pulse synchronization. An example is illustrated in FIG. 4 where the angle between adjacent burner slots (or spuds) alternates between 50° and 70° as designated by reference characters $\alpha$ and $\beta$.

Figure 5:
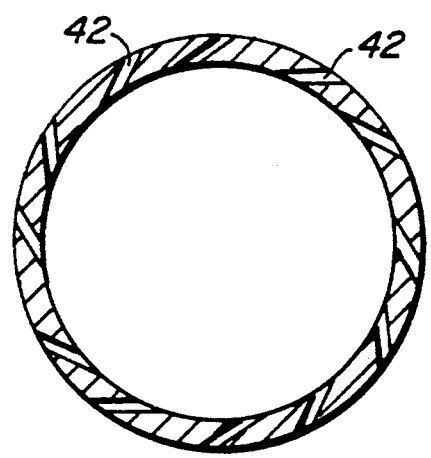
FIG. 5 is a sectional view of the burner central nozzle illustrated in FIG. 1.

Burner plate 6 includes a central cut or opening 29 where central burner nozzle 18 and spinner 20 ar arranged. Preferably, opening 29, nozzle 18, and spinner 20 are concentrically positioned about burner center axis 28. Central nozzle 18 and spinner 20 add to the complexity of the flame front shape and further render the burner less sensitive to pulsating supply air, minimizing rumbling. A central burner nozzle 18 provided with a plurality of tangentially drilled gas discharge ports 42 (shown in FIGS. 1 and 5) induces a swirl in the center of the combustion chamber and in tests has functioned exceedingly well. However, it is believed that other nozzle designs, including a different arrangement of discharge ports than illustrated in FIG. 5, should work equally well.

It also has been found that when the burner spud arrangement described above is used in combination with central burner nozzle 18, that enhanced flame stability results. That is, flame blow-out is not a concern up to about 110% excess air. One advantage of this relatively wide range, is that it reduces the requirements of the control system to control the fuel-to-air ratio since the ratio is less critical in view of the relatively wide range noted above.

Figure 6:
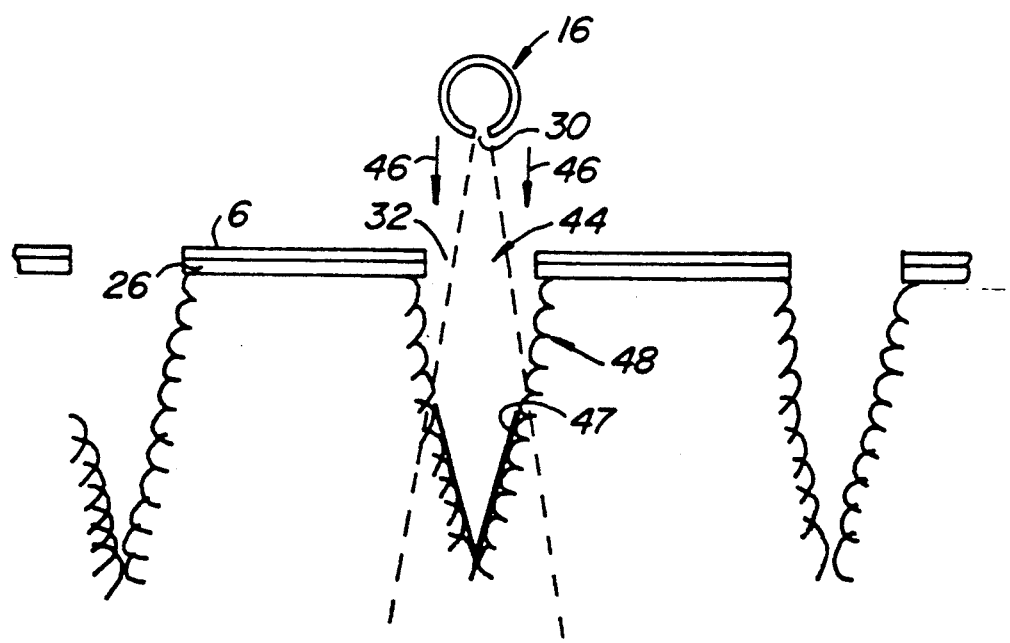
FIG. 6 illustrates the cone-shaped fuel jets and accompanying flame front in accordance with the present invention.

The operation of the burner will be described with reference to FIG. 6. Fuel gas, at a pressure of about 10 psig in fuel gas burner tubes 16, is discharged at a very high speed through fuel gas tube discharge openings 30, i.e., at full load the fuel gas exits the spuds at 200–400 m/s in the direction of the slots in plate 6. Combustion air, generally designated with reference numeral 46, flows through the burner slots also at a velocity of about 30–40 m/s. The very high fuel gas and combustion air velocities generate very high turbulence in the combustion chamber so that the desired high intensity flame is achieved, while the ignition of the fuel is delayed to a point downstream from the burner plate where it has been mixed with enough excess air so that the combustion temperature does not become too high thereby limiting $NO_x$ production. As the cone-shaped fuel gas jet 44 expands downstream, air progressively frays at its margin. A flame front 47 is established at a point downstream from the burner plate where sufficient amount of recirculating hot gases penetrate into the cone-shaped jet for ignition. As shown in FIG. 6, the resultant flame is anchored to burner plate refractory 26. The marginal eddy currents of the recirculation gases in the recirculation zone are generally indicated with reference numeral 48. Since the width of the recirculation zones varies significantly with the distance from the center axis 28 of the burner plate, the local ignition patterns also vary. As a result, local oscillations of flame front occur at different frequencies and are not synchronized. In this way, vibrations are greatly dampened and resonance problems are minimized or eliminated.

Merely to exemplify the makeup of a burner that was tested and provided the foregoing results, the following example is recited. This example is given for purposes of illustration, and is not intended to limit the scope of this invention. The outside diameter of the burner plate was 20 inches and the center hole in which the central burner nozzle and spinner were arranged had a diameter of 8 inches. Six radial slots and burner tubes were arranged around the central burner nozzle and spinner as illustrated in FIG. 2. The slot widths were about 2 inches, while the distance between the discharge openings of each burner and the outermost point of the corresponding burner plate slot was about 4 inches. Air flow was provided through the radial slots and the annular spinner at a ratio of 98:2. The center burner nozzle was operated close to stoichiometric conditions, while the radial slots ran with 70–110% excess air. These parameters are especially appropriate for air heaters. For boiler applications where high amounts of excess air can greatly reduce the efficiency of the boiler system, the total amount of excess air can be reduced by means of secondary fuel injection.

The above is a detailed description of a preferred embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:
1. A burner comprising:
 a burner plate having a plurality of nonparallel, radically extending slots formed therethrough and arranged in a circular pattern adjacent a central region of said plate for introducing air and fuel gas into combustion chamber, the ratio of the distance between outer end portions of adjacent slots and inner end portions of adjacent slots is at least about 2:1 substantially varying between the central region and perimeter; and a plurality of burner tubes adapted to be coupled to a fuel source, each tube including a plurality of discharge openings and being oriented such that its discharge openings are aligned with one of said slots for directing fuel gas therethrough.

2. The burner of claim 1 wherein the ratio of the greatest and least distances between adjacent burner slots is at least about 2.5:1.

3. The burner of claim 1 wherein the ratio between the distance from each burner plate slot, measured from the outer surface of the burner plate, and the burner tube openings aligned therewith and the width of the burner plate slot is about 1.5:1 to 4:1.

4. The burner of claim 1 further including means for providing fuel gas to said tubes such that fuel gas is discharged from said tubes at a velocity sufficient to generate very high turbulence downstream from said burner plate.

5. The burner of claim 4 further including means or discharging combustion air from said slots.

6. A burner comprising:
a burner plate having an outer surface for facing a combustion chamber, an inner surface, and a plurality of circumferentially arranged generally radially extending slots formed therethrough for introducing air and fuel gas into a combustion chamber; and
a plurality of circumferentially arranged generally radially extending burner tubes each having an inner end portion adapted to be coupled to a fuel gas source and an outer end portion, each tube including a plurality of discharge openings and being oriented such that its discharge openings are aligned with one of said slots for directing fuel gas therethrough, said burner tubes further being oriented such that the ratio of the distance between outer end portions of adjacent slots and inner end portions of adjacent slots is at least 2:1.

7. The burner of claim 6 wherein the ratio between said distance between the outer end portions and said distance between the inner end portions is at least about 2.5:1.

8. The burner of claim 6 wherein the ratio between the distance from each burner plate slot, measured from the outer surface of the burner plate, and the burner tube openings aligned therewith and the width of the burner plate slot is about 1.5:1 to 4:1.

9. The burner of claim 6 further including means for providing fuel gas to said tubes such that fuel gas is discharged from said tubes at a velocity sufficient to generate very high turbulence downstream from said burner plate.

10. The burner of claim 9 further including means for discharging combustion air from said slots.

11. The burner of claim 6 wherein the openings in each of said burner tubes are arranged in a row which is substantially parallel to the center axis of the slot aligned therewith.

12. The burner of claim 6 wherein said burner plate is annular and the slots extend toward the perimeter thereof.

13. The burner of claim 6 wherein the width of each slot increases as the slot approaches the outer perimeter of said burner plate.

14. The burner of claim 6 further including a central gas nozzle arranged at the center of said burner plate, said gas nozzle having fuel gas discharge ports oriented to direct fuel gas in a direction tangential to the nozzle to induce gas exiting therefrom to swirl downstream from the burner plate.

15. The burner of claim 14 further including a spinner arranged about said central gas nozzle.

16. The burner of claim 6 including at least 3 of said burner tubes, the angle formed between one burner tube and the burner tube adjacent thereto in the clockwise direction substantially differing from the angle formed between said one burner tube and the burner tube adjacent thereto in the counterclockwise direction.

17. A burner comprising:
a burner plate having a plurality of generally circumferentially arranged radially extending slots formed therethrough for introducing air and fuel gas into a combustion chamber; and
a plurality of generally circumferentially arranged radially extending burner tubes, each having a plurality of discharge openings aligned with one of said slots, the angle formed between one burner tube and the burner tube adjacent thereto in the clockwise direction substantially differing from the angle formed between said one burner tube and the burner tube adjacent thereto in the counterclockwise direction.

18. The burner of claim 17 further including means for providing fuel gas to said tubes such that fuel gas is discharged from said tubes at a velocity sufficient for generating very high turbulence downstream from the burner plate.

19. The burner of claim 17 including at least 3 of said burner tubes.

20. The burner of claim 17 wherein the ratio between the distance from each burner plate slot, measured from the outer surface of the burner plate, and the burner tube openings aligned therewith and the width of the burner plate slot is about 1.5:1 to 4:1.

21. The burner of claim 17 wherein the openings in each of said burner tubes are aligned in a row.

22. The burner of claim 21 wherein each row of openings is substantially parallel to the center axis of the corresponding slot.

23. The burner of claim 17 wherein said burner plate is annular and the slots extend toward the perimeter thereof.

24. The burner of claim 17 wherein the width of each slot increases as the slot approaches the outer perimeter of said burner plate.

25. The burner of claim 17 further including a central gas nozzle arranged at the center of said burner plate, said gas nozzle having fuel gas discharge ports oriented to direct fuel gas in a direction tangential to the nozzle to induce gas exiting therefrom to swirl in the region downstream from the burner plate.

26. The burner of claim 25 further including a spinner arranged about said central gas nozzle.

27. The burner of claim 17 wherein each burner tube includes an outer end portion and an inner end portion, the outer end portions of adjacent burner tubes being spaced apart a distance substantially greater than the distance between the inner end portions of said adjacent tubes.

* * * * *